United States Patent
Miyakawa

(10) Patent No.: US 9,646,151 B2
(45) Date of Patent: May 9, 2017

(54) ACCESS TOKEN MANAGEMENT

(71) Applicant: PFU LIMITED, Kahoku-shi, Ishikawa (JP)

(72) Inventor: Osamu Miyakawa, Kahoku (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/713,786

(22) Filed: May 15, 2015

(65) Prior Publication Data

US 2016/0224782 A1    Aug. 4, 2016

(30) Foreign Application Priority Data

Jan. 30, 2015 (JP) ................................. 2015-017382

(51) Int. Cl.
| | |
|---|---|
| *G06F 7/04* | (2006.01) |
| *G06F 21/45* | (2013.01) |
| *G06F 21/31* | (2013.01) |
| *H04L 29/06* | (2006.01) |
| *G06F 21/33* | (2013.01) |

(52) U.S. Cl.
CPC .............. *G06F 21/45* (2013.01); *G06F 21/31* (2013.01); *G06F 21/33* (2013.01); *H04L 63/0838* (2013.01); *H04L 63/0846* (2013.01)

(58) Field of Classification Search
CPC ................................ G06F 21/45; G06F 21/31
USPC ....................................................... 726/2–10
See application file for complete search history.

(56) References Cited

U.S. PATENT DOCUMENTS

2006/0282386 A1* 12/2006 Szeto .................... H04L 12/581
                                                                    705/50
2007/0043954 A1*  2/2007 Fox ......................... G06F 21/34
                                                                    713/185
2008/0162582 A1*  7/2008 Brooks ............. G06F 17/30067

(Continued)

FOREIGN PATENT DOCUMENTS

| JP | 2007-286883 A | 11/2007 |
| JP | 2009-31967 A  |  2/2009 |

(Continued)

OTHER PUBLICATIONS

Liu et al., "A Token Scheduled High Throughput Multi-Channel Data Collection Protocol for Wireless Sensor Network," 2013 IEEE 77th Vehicular Technology Conference (VTC Spring) Year: 2013 pp. 1-5.*

(Continued)

*Primary Examiner* — Roderick Tolentino
(74) *Attorney, Agent, or Firm* — Westerman, Hattori, Daniels & Adrian, LLP

(57) ABSTRACT

Provided is a server including: a user authenticating unit that authenticates, using an access token, a user of a user device; a token receiving unit that receives an access token from the user device; and a determination information transmitting unit which, when the access token is received, transmits determination information that enables a determination as to whether or not a remaining time until a time of expiration of the access token is less than a predetermined threshold, to the user device, wherein the user authenticating unit issues a new access token with an updated time of expiration when an issuance request for an access token which is transmitted by the user device having received the determination information is received.

3 Claims, 10 Drawing Sheets

(56) References Cited

U.S. PATENT DOCUMENTS

| | | | |
|---|---|---|---|
| 2009/0313477 A1* | 12/2009 | Park | H04N 7/181 713/182 |
| 2011/0271099 A1* | 11/2011 | Preiss | H04L 63/0807 713/155 |
| 2012/0039326 A1* | 2/2012 | Chia | H04L 63/04 370/342 |
| 2012/0110646 A1 | 5/2012 | Ajitomi et al. | |
| 2013/0003106 A1 | 1/2013 | Nishida et al. | |
| 2014/0282919 A1* | 9/2014 | Mason | H04L 63/0807 726/4 |
| 2014/0380428 A1 | 12/2014 | Kobayashi | |
| 2015/0046971 A1* | 2/2015 | Huh | H04L 9/3213 726/1 |
| 2015/0092233 A1* | 4/2015 | Park | G06F 3/1288 358/1.15 |
| 2015/0350186 A1* | 12/2015 | Chan | H04L 63/083 726/9 |

FOREIGN PATENT DOCUMENTS

| | | |
|---|---|---|
| JP | 2009-059065 A | 3/2009 |
| JP | 2012-98839 A | 5/2012 |
| JP | 2013-033437 A | 2/2013 |
| JP | 2013-238965 A | 11/2013 |
| JP | 2014-10486 A | 1/2014 |
| JP | 2015-5222 A | 1/2015 |

OTHER PUBLICATIONS

Chen et al., "The Low-Cost Secure Sessions of Access Control Model for Distributed Applications by Public Personal Smart Cards," 2011 IEEE 17th International Conference on Parallel and Distributed Systems Year: 2011 pp. 894-899.*

K. Kawasaki, "2-6 Processing in Java Servlet/ 3-5 Session management, Introduction to Java Servlet & JSP", The first edition, Japan, Shuwa System Co., Ltd., Jul. 4, 2011, The first edition, pp. 156-160, pp. 233-249 with partial translation.

Office Action dated Feb. 16, 2016, issued in counterpart Japanese Patent Application No. 2015-017382, with English translation (12 pages).

* cited by examiner

ACCESS TOKEN MANAGEMENT

CROSS-REFERENCE TO RELATED APPLICATION

This application is based upon and claims the benefit of priority of the prior Japanese Patent Application No. JP2015-017382, filed on Jan. 30, 2015, the entire contents of which are incorporated herein by reference.

FIELD

The present disclosure relates to a technique for managing access tokens.

BACKGROUND

Conventionally, an information processing device is proposed which communicates with a relaying service device that performs a relay process related to a service provided to a user by a providing device via a network and which communicates with an authentication service device that performs an authentication process, the information processing device including: an acquiring unit to transmit, when an authentication request is accepted from the relaying service device and an access token is not included in the authentication request, the authentication request to the authentication service device and acquiring an access token from the authentication service device having succeeded in authentication; and a validity date determining unit to determine whether or not there remains a certain period or more of a validity time of an access token that is included in the authentication request upon accepting the authentication request, wherein when the validity date determining means determines that a certain period or more of the validity time of the access token remains, the access token is reused as an access token to be used when the relaying service device issues an authentication request, and when the validity date determining means determines that the remaining validity time is insufficient, an access token is acquired from the authentication service device by the acquiring means (refer to Japanese Patent Application Publication No. 2013-033437).

In addition, an electronic device is proposed which includes: a CPU that generates an authentication token when receiving an authentication OK signal that permits authentication from a center server; a nonvolatile EEPROM that stores the authentication token generated by the CPU; a volatile RAM that stores the authentication token generated by the CPU; and a CPU which, when an authentication token is stored in the RAM upon recovering from a failure, evaluates whether or not the authentication token stored in the EEPROM and the authentication token stored in the RAM match each other, and which continues an authenticated state with the center server when the authentication tokens match each other (refer to Japanese Patent Application Publication No. 2009-059065).

SUMMARY

An example of the present disclosure is a server including: user authenticating means for authenticating, using an access token, a user of a user device connected via a network; token receiving means for receiving an access token from the user device; and determination information transmitting means for transmitting, when the access token is received, determination information that enables a determination as to whether or not a remaining time until a time of expiration of the access token is less than a predetermined threshold, to the user device, wherein the user authenticating means issues a new access token with an updated time of expiration when an issuance request for an access token which is transmitted by the user device having received the determination information is received.

The present disclosure may be viewed as an information processing device, a system, a method that is executed by a computer, and a program to be executed by a computer.

In addition, the present disclosure may be viewed as a recording of such a program on a recording medium that is readable by a device such as a computer, a machine, or the like.

In this case, a recording medium that is readable by a computer or the like refers to a recording medium which stores information such as data and programs by an electric action, a magnetic action, an optical action, a mechanical action, or a chemical action and which can be read by a computer or the like.

DESCRIPTION OF EMBODIMENTS

Hereinafter, an embodiment of a server, a system, a method, and a program according to the present disclosure will be described with reference to the drawings.

It should be noted that the embodiment described below merely exemplifies the present disclosure and is not intended to limit a server, a system, a method, and a program according to the present disclosure to the specific configurations described below. When implementing the present disclosure, a specific configuration may be adopted as appropriate in accordance with each embodiment. In addition, various improvements and modification may be made to the present disclosure.

As the present embodiment, an embodiment in which a server, a system, a method, and a program according to the present disclosure are implemented in a system that is interlocked with a scanner will be described. However, a server, a system, a method, and a program according to the present disclosure can be widely used with respect to access token management and may be used for the purpose of managing access tokens used by a user device that is not a scanner. Accordingly, objects of application of the present disclosure are not limited to the examples described in the present embodiment.

<Configuration of System>

Figure 1:
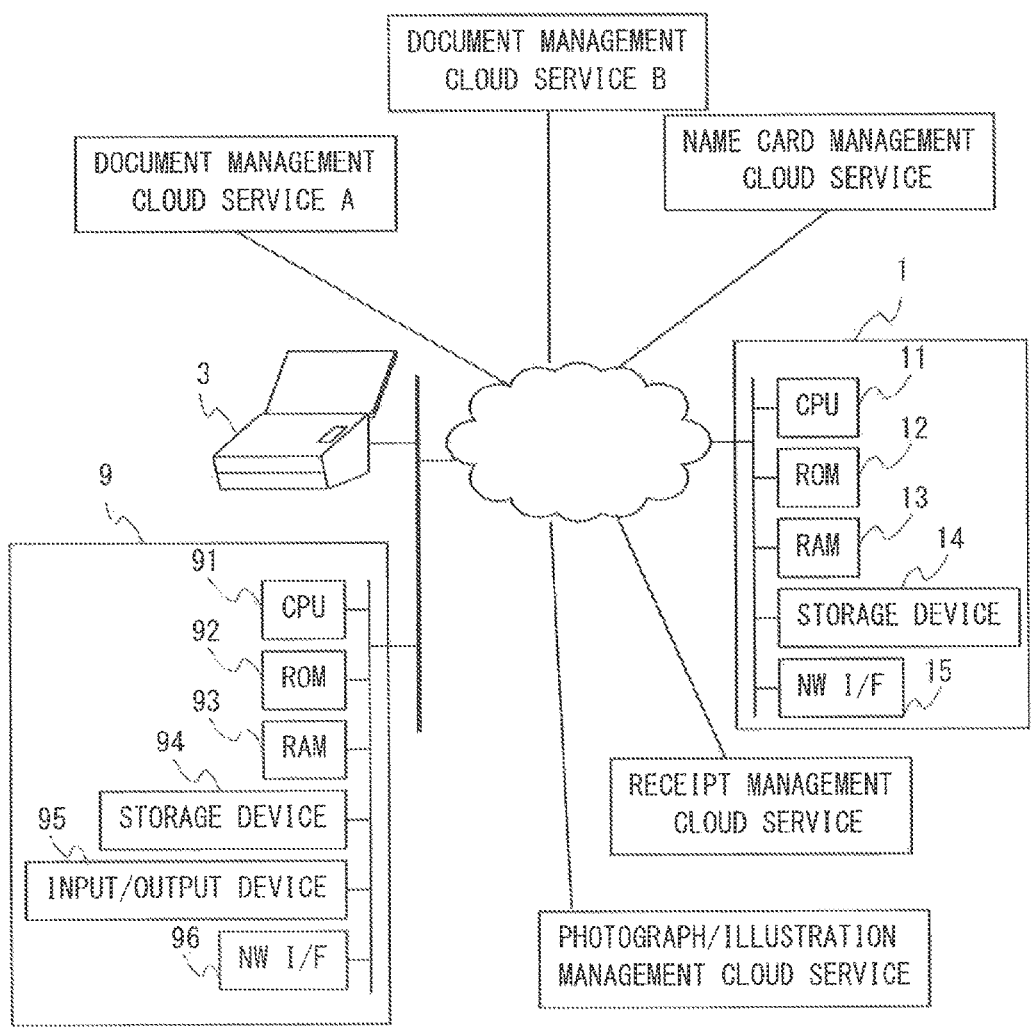
FIG. 1 is a schematic diagram showing a configuration of a system according to an embodiment.

FIG. 1 is a schematic diagram showing a configuration of a system 1 according to the present embodiment. The system 1 according to the present embodiment includes a scanner 3 and an image data processing server 1 which are connected via a network such as the Internet or a wide area network.

The image data processing server 1 is a computer including a central processing unit (CPU) 11, a read only memory (ROM) 12, a random access memory (RAM) 13, a storage device 14 that is an electrically erasable and programmable read only memory (EEPROM), an hard disk drive (HDD), or the like, a communicating unit 15, and the like. Moreover, while the image data processing server 1 is shown in the drawing to be a computer housed in a single case for the sake of simplicity, in the present embodiment, the image data processing server 1 provides an image data processing service to a user by having apart of or all of its functions executed by a device installed at a remote location or a plurality of devices installed in a distributed manner using cloud technology or the like. However, the configuration of the image data processing server 1 is not limited to the configuration exemplified in the present embodiment.

Figure 2:
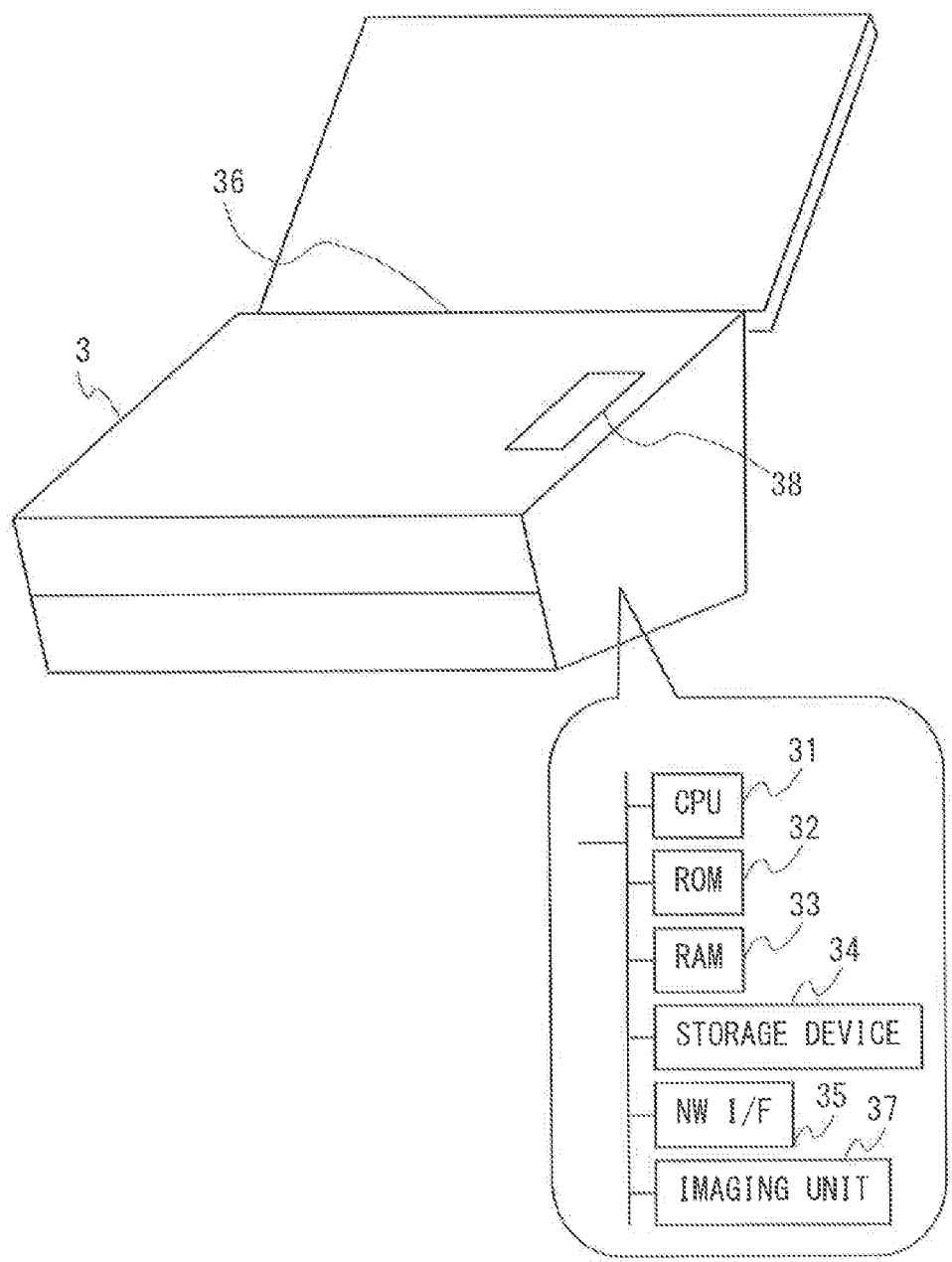
FIG. 2 is a diagram showing a hardware configuration of a scanner according to an embodiment.

FIG. 2 is a diagram showing a hardware configuration of the scanner 3 according to the present embodiment. The scanner 3 is a device which acquires image data by capturing an image of an original document such as a document, a name card, a receipt, and a photograph/illustration set by the user and is an imaging device including a sheet feeder 36 that feeds an original document to an imaging unit 37, the imaging unit 37, a scan button 38, a CPU 31, a ROM 32, a RAM 33, a storage device 34, a communicating unit 35, and the like. Moreover, while a scanner 3 adopting an image system in which images of an original document set in the sheet feeder 36 are captured while the original document is being automatically fed is exemplified in the present embodiment, the imaging system of a scanner is not restrictive. For example, a scanner of a type in which an image of an original document set at a reading position by the user may be used. In addition, while an example of using the scanner 3 as an imaging device to be used in the present system will be described in the present embodiment, the imaging device to be used in the present system is not limited to a scanner. For example, a camera may be adopted as the imaging device.

The scanner 3 according to the present embodiment is capable of connecting to a wireless LAN due to being provided with a wireless communication function. In addition, while the scanner 3 according to the present embodiment includes the scan button 38 that is pressed or touched by the user to instruct the scanner 3 to capture an image, the scanner 3 does not include a user interface that enables character input/output and item selection such as a touch panel display and a keyboard nor does the scanner 3 include a web browser function and a server function. However, communicating means, hardware configuration, and the like of a scanner capable of adopting the method according to the present embodiment is not limited to those exemplified in the present embodiment.

In addition, a user terminal 9 such as a so-called smartphone, a tablet, and a personal computer is connected to the system according to the present embodiment. The user terminal 9 is a computer including a CPU 91, a ROM 92, a RAM 93, a storage device 94, an input/output device 95, a communicating unit 96, and the like. As shown in FIG. 1, the user terminal 9 may communicate with the scanner 3 and the image data processing server 1 by being connected to a local network to which the scanner 3 is connected or may communicate with the scanner 3 and the image data processing server 1 by being connected to a mobile phone network.

Furthermore, an application for using the system according to the present embodiment has been downloaded to and installed in the user terminal 9 in advance. The application enables settings and the like to be made on the scanner 3 via the network. Therefore, a user interface that enables character input/output and item selection such as a touch panel display and a keyboard can be omitted from the scanner 3 according to the present embodiment. In addition, the application enables accounts to be created, login and logout to be performed, settings to be made, and the like on the image data processing server 1 via the network. As a result, with the system according to the present embodiment, by simply operating the user terminal 9 to complete preparations related to the entire system, setting an original document on the scanner 3, and operating the scan button 38, the user can transmit data obtained from the original document to an appropriate cloud service.

In addition, the image data processing server 1 and the user terminal 9 are capable of communicating with a plurality of cloud services (including services provided by third parties) on the Internet which provide various services to the user. Moreover, while hardware configurations of cloud services other than the image data processing server 1 are not illustrated in FIG. 1, each of the cloud services features computers with the same hardware configuration as the image data processing server 1 being installed in a distributed manner using cloud technology. While examples of these cloud services include a document management service, a name card management service, a receipt management service, and a photograph/illustration management service, cloud services that can be interlocked with the system 1 according to the present embodiment are not limited to those exemplified in the present disclosure.

Figure 3:
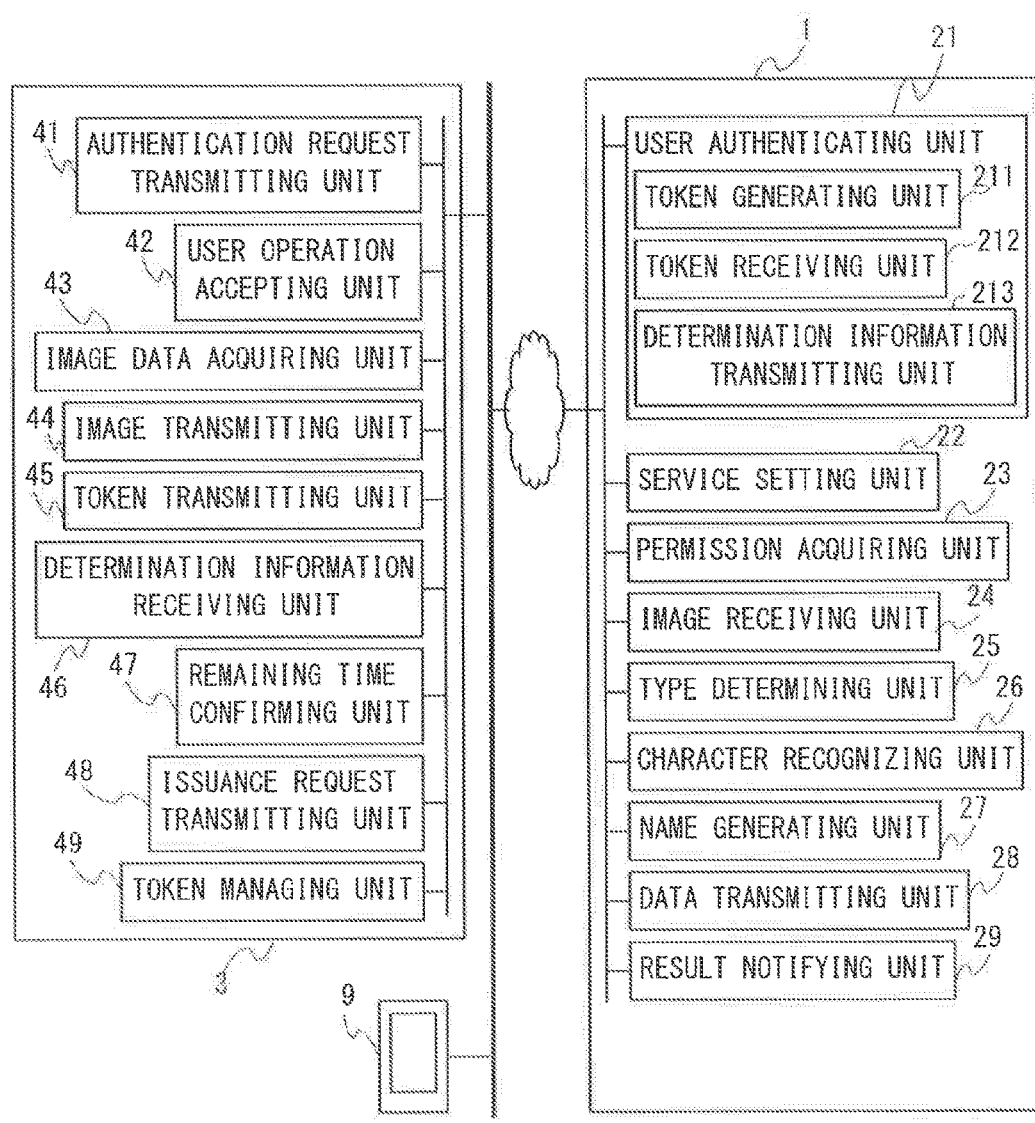
FIG. 3 is a diagram schematically showing a functional configuration of a system according to an embodiment.

FIG. 3 is a diagram schematically showing a functional configuration of the system according to the present embodiment. As respective hardware included in the image data processing server 1 are controlled by having a program recorded in the storage device 14 read by the RAM 13 and executed by the CPU 11, the image data processing server 1 functions as a device that includes a user authenticating unit 21, a service setting unit 22, a permission acquiring unit 23, an image receiving unit 24, a type determining unit 25, a character recognizing unit 26, a name generating unit 27, a data transmitting unit 28, and a result notifying unit 29. Moreover, in the present embodiment, the respective functions of the image data processing server 1 are executed by the CPU 11 that is a general purpose processor. Alternatively, a part of or all of the functions may be executed by one or a plurality of dedicated processors.

In response to an authentication request transmitted from the user terminal 9 or the scanner 3, the user authenticating unit 21 authenticates the user of the user terminal 9 or the scanner 3. The authentication request includes authentication information necessary for authentication. In the present embodiment, while a user ID and a password are used as authentication information, other information may be used as authentication information. Moreover, since the scanner 3 according to the present embodiment does not include a user interface that enables character input/output and item selection as described earlier, an authentication request is transmitted to the image data processing server 1 using authentication information, the notification of which is issued from the user terminal 9 to the scanner 3.

In the present embodiment, an access token (hereinafter, referred to as an "image data processing server access token" to distinguish the access token from a cloud service access token to be described later) is used to authenticate the user. Upon receiving an authentication request from the user terminal 9 or the scanner 3, the user authenticating unit 21 verifies authentication information included in the authentication request, and when the authentication information is appropriate, transmits an image data processing server access token to a transmission source of the authentication request (the user terminal 9 or the scanner 3). The user terminal 9 or the scanner 3 having received the image data processing server access token subsequently communicates with the image data processing server 1 using the image data processing server access token.

Moreover, in the present embodiment, in order to authenticate a user of the scanner 3, the user authenticating unit 21 includes a token generating unit 211, a token receiving unit 212, and a determination information transmitting unit 213 which will be described below.

The token generating unit 211 generates an image data processing server access token using identification information of the scanner 3 and expiration time related information that is related to a date/time of expiration (hereinafter, referred to as "expiration time") of an access token. Specifically, the token generating unit 211 generates an access token by encrypting data including a serial number (identification information) of the scanner 3 and a time stamp (expiration time related information) indicating a date and time of generation of the access token. Therefore, in the present embodiment, when the user authenticating unit 21 receives an access token from the scanner 3, the user authenticating unit 21 performs authentication by decrypting the access token to extract a serial number and a time stamp and confirming that the extracted serial number matches a serial number that is associated with a user account and that an expiration time which is calculated by adding a predetermined validity period (for example, 30 days) to the extracted time stamp has not expired. Moreover, while an example in which a time stamp indicating a date and time of generation of an access token is used as the expiration time related information is described in the present embodiment, information that is used as expiration time related information to generate an image data processing server access token is not limited to the example described in the present embodiment. For example, the image data processing server 1 may use an expiration time of an image data processing server access token as the expiration time related information.

The token receiving unit 212 receives an image data processing server access token from the scanner 3.

When an image data processing server access token is received, the determination information transmitting unit 213 transmits determination information (in the present embodiment, a remaining time until an expiration time of an image data processing server access token) that enables a determination as to whether or not a remaining time until an expiration time of the image data processing server access token is less than a predetermined threshold (for example, 7 days) to the scanner 3.

The service setting unit 22 sets a cloud service specified by the user as a transmission destination of image data and the like when the image data is of a predetermined type as a predetermined cloud service. In other words, with the image data processing server 1 according to the present embodiment, a data transmission destination cloud service in a case where image data is image data of a predetermined type can be set as a cloud service desired by the user. For example, when there are a plurality of document management services (for example, the document management service A and the document management service B shown in FIG. 1), by specifying a desired document management cloud service to the image data processing server 1 via an application that runs on the user terminal 9, the user can set a cloud service to be a transmission destination of data in a case where image data is document image data as a document management service that is specified by the user. This also applies to cloud services that manage data related to image data of other types or, in other words, to a name card management service, a receipt management service, and a photograph/illustration management service.

The permission acquiring unit 23 transmits an access permission request with respect to a predetermined cloud service in accordance with a request transmitted from the user-authenticated user terminal 9 and acquires access permission to a user account of the predetermined cloud service from the predetermined cloud service.

In the present embodiment, OAuth 2.0 authentication is used as means for receiving access permission from a cloud service and an access token (hereinafter, referred to as a "cloud service access token" to distinguish the access token from the image data processing server access token described earlier) is used as access permission. By transmitting an access permission request to each cloud service set by the service setting unit 22 among the cloud services that are interlocked with the present system, the image data processing server 1 receives an access token that is issued by each cloud service. The received access token for each cloud service is associated with an account of the user in the image data processing server 1 and saved in the image data processing server 1.

The image receiving unit 24 receives, via the network, image data which is acquired by and transmitted from the user-authenticated scanner 3.

The type determining unit 25 determines a type of the received image data. Moreover, in the present embodiment, the type that is determined by the type determining unit 25 includes at least any of a document, a name card, a receipt, and a photograph/illustration. However, the type of image data that can be determined by the type determining unit 25 is not limited to the types exemplified in the present embodiment.

The character recognizing unit 26 performs optical character recognition (OCR) on image data.

The name generating unit 27 generates a name of image data or data generated based on the image data, using a character string obtained as a result of optical character recognition. As the name of data, for example: when the determination by the type determining unit 25 reveals that the type of image data is a document, the name generating unit 27 generates a character string including a title and a creation date of the document; when the determination by the type determining unit 25 reveals that the type of image data is a name card, the name generating unit 27 generates a character string including a name and an organization name; and when the determination by the type determining unit 25 reveals that the type of image data is a receipt, the name generating unit 27 generates a character string including a store name and a received date.

When the type determining unit 25 determines that image data is of a predetermined type, the data transmitting unit 28 transmits the image data or data generated based on the image data (hereinafter, simply referred to as "data") to a user account of a predetermined cloud service. When transmitting data to the user account of the cloud service, an access token that is saved in the image data processing server 1 in association with an account of a user who has been authenticated by the user authenticating unit 21 as the user of the scanner 3 having transmitted the image data is used among the respective cloud service access tokens acquired from the respective cloud services by the permission acquiring unit 23.

Accordingly, when the type determining unit 25 determines that image data is document image data, the data transmitting unit 28 can transmit the image data or data generated based on the image data to a user account of a document management service specified by a user who has been authenticated as the user of the scanner 3 having transmitted the image data using an access token acquired from the document management service with respect the user.

The result notifying unit 29 notifies the user of a result (completion, failure, and the like) of data transmission by the data transmitting unit 28 by performing a release result notification.

As respective hardware included in the scanner 3 are controlled by having a program recorded in the storage device 34 read by the RAM 33 and executed by the CPU 31, the scanner 3 functions as a device that includes an authentication request transmitting unit 41, a user operation accepting unit 42, an image data acquiring unit 43, an image transmitting unit 44, a token transmitting unit 45, a determination information receiving unit 46, a remaining time confirming unit 47, an issuance request transmitting unit 48, and a token managing unit 49. Moreover, in the present embodiment, the respective functions of the scanner 3 are controlled by the CPU 31 that is a general purpose processor. Alternatively, a part of or all of the functions may be controlled by one or a plurality of dedicated processors.

The authentication request transmitting unit 41 transmits, to the image data processing server 1, an authentication request including authentication information, the notification of which is issued from the user terminal 9 to the scanner 3.

The user operation accepting unit 42 accepts a predetermined user operation. In the present embodiment, as the predetermined user operation, pressing or touching the scan button 38 provided on the scanner 3 is accepted as a user operation for collectively instructing a series of processes from starting a scan to transmitting data to an appropriate cloud service. However, the predetermined user operation that triggers a scan to start is not limited to the example according to the present disclosure.

When the predetermined user operation is accepted by the user operation accepting unit 42, the image data acquiring unit 43 acquires image data by capturing an image of an object. Specifically, when an operation of the scan button 38 is accepted by the user operation accepting unit 42, the image data acquiring unit 43 of the scanner 3 according to the present embodiment acquires image data of an original document by controlling the sheet feeder 36 to send the original document to the imaging unit 37 and then controlling the imaging unit 37 to capture an image of the original document.

The image transmitting unit 44 transmits the image data acquired by the image data acquiring unit 43 to the image data processing server 1 via the network. In addition, transmission of image data by the image transmitting unit 44 is executed following the acquisition of the image data without involving operations other than the predetermined user operation (in the present embodiment, an operation of the scan button 38).

The token transmitting unit 45 transmits an image data processing server access token to the image data processing server 1.

The determination information receiving unit 46 receives, as determination information, a remaining time until an expiration time of the image data processing server access token from the image data processing server 1.

The remaining time confirming unit 47 determines, when determination information is received, whether or not the remaining time until an expiration time of the image data processing server access token is less than a predetermined threshold.

The issuance request transmitting unit 48 transmits an issuance request for the image data processing server access token when the remaining time until the expiration time of the image data processing server access token is determined to be less than the predetermined threshold.

When a new access token for the image data processing server (hereinafter, referred to as a "new access token") is received, the token managing unit 49 validates the new access token and invalidates an old access token for the image data processing server (hereinafter, referred to as an "old access token").

<Flow of Processes>

Next, a flow of processes executed by the system 1 according to the present embodiment will be described. It is to be understood that specific contents and a specific sequence of processes described below merely represent one example of implementing the present disclosure. Specific contents and sequences of the processes may be appropriately selected in accordance with embodiments of the present disclosure.

Figure 4:
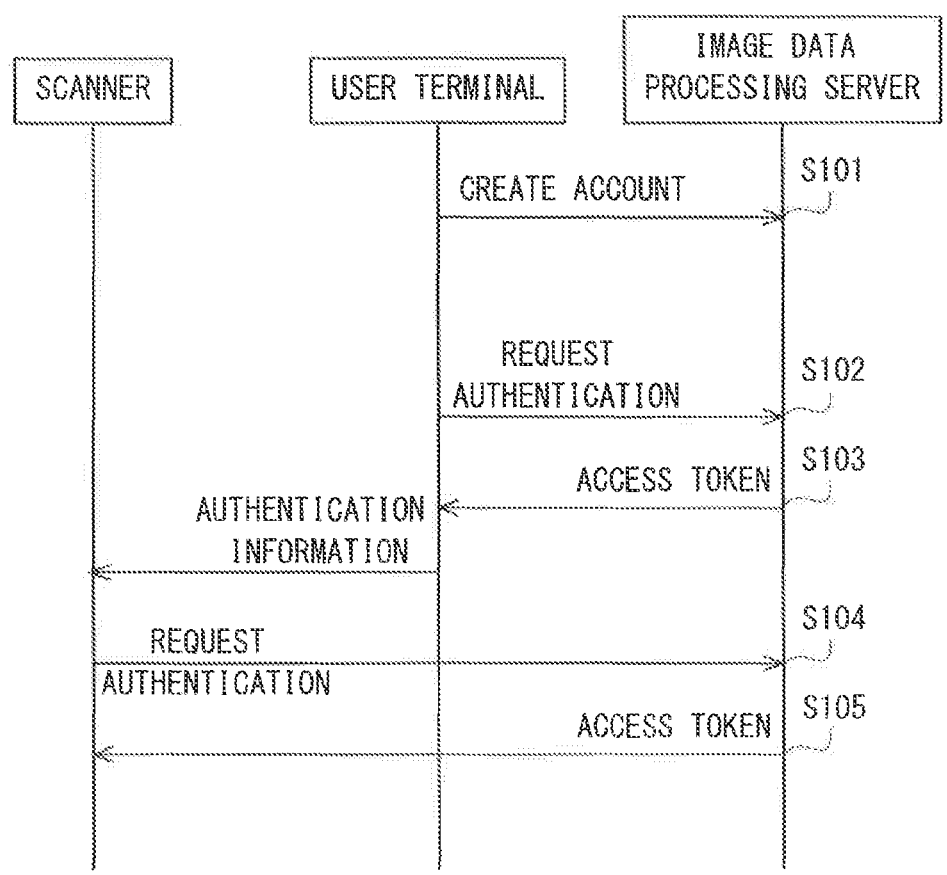
FIG. 4 is a sequence diagram showing an outline of a flow of an account creation/user authentication process according to an embodiment.

FIG. 4 is a sequence diagram showing an outline of a flow of an account creation/user authentication process according to the present embodiment.

In step S101, a user account is created. The user starts an application on the user terminal 9 that is a smartphone or the like. The started application prompts the user to input information (such as a user ID and a password) which is required to create an account and transmits the information input by the user to the image data processing server 1. The image data processing server 1 determines whether or not the information received from the user terminal 9 is appropriate, and when the information is determined to be appropriate, creates an account of the user. In addition, the application saves authentication information (in the present embodiment, a user ID and a password) for logging into the created user account, in the user terminal 9.

In steps S102 and S103, a login process to the image data processing server 1 is performed by the user terminal 9. In response to an authentication request transmitted from the user terminal 9, the user authenticating unit 21 authenticates the user of the user terminal 9. Specifically, upon receiving an authentication request from the user terminal 9 (step S102), the user authenticating unit 21 verifies authentication information that is included in the authentication request, and when the authentication information is consistent with the account information created in step S101, the user authenticating unit 21 transmits an image data processing server access token to the user terminal 9 that is a transmission source of the authentication request (step S103). The user terminal 9 having received the image data processing server access token subsequently communicates with the image data processing server 1 using the received access token.

In addition, after creating an account in the image data processing server 1, the user starts an application on the user terminal 9 and causes the user terminal 9 to be connected to the scanner 3 via a wireless network. Furthermore, the application notifies the scanner 3 of the authentication information which is created in step S101 and saved in the user terminal 9 and which is used to log into the image data processing server 1. The authentication request transmitting unit 41 of the scanner 3 having received the notification of the authentication information transmits an authentication request including the authentication information to the image data processing server 1.

In steps S104 and S105, a login process to the image data processing server 1 is performed by the scanner 3. When the authentication request transmitted by the scanner 3 is received by the image data processing server 1 (step S104), the user authenticating unit 21 of the image data processing server 1 authenticates the user of the scanner 3. The user authenticating unit 21 verifies the authentication information included in the authentication request that is received from the scanner 3, and when the authentication information is consistent with the account information created in step S101, the user authenticating unit 21 transmits an image data processing server access token to the scanner 3 that is a transmission source of the authentication request (step S105). The scanner 3 having received the image data processing server access token subsequently communicates with the image data processing server 1 using the received access token.

Figure 5:
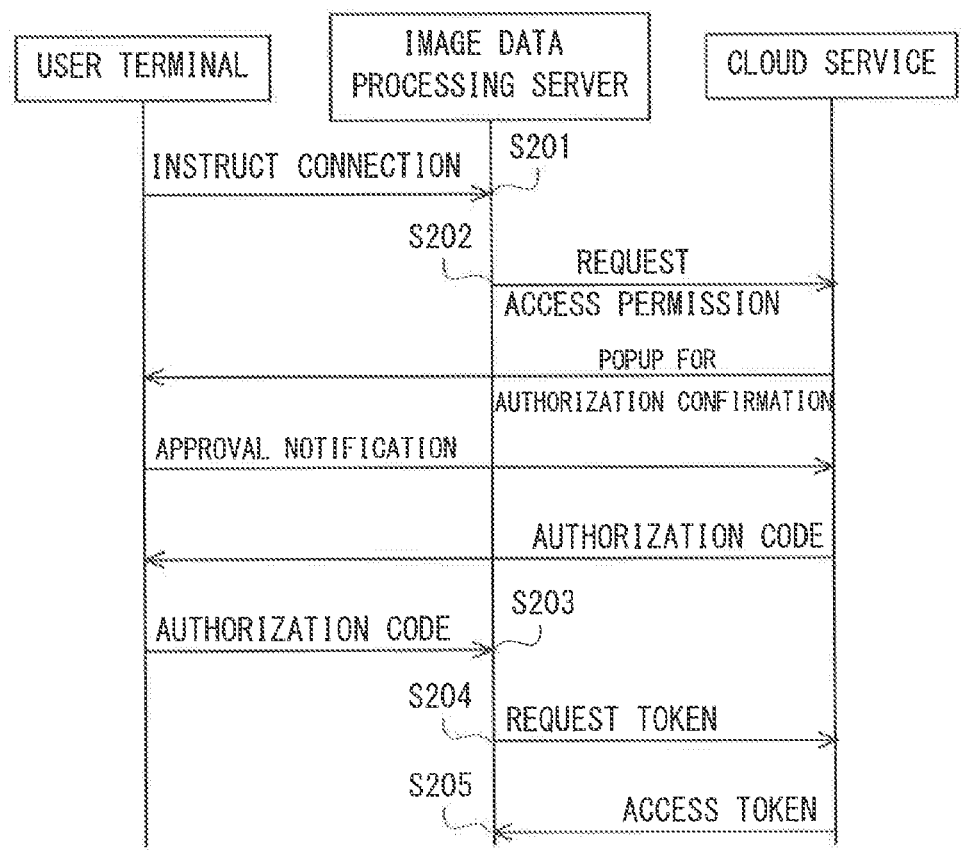
FIG. 5 is a sequence diagram showing an outline of a flow of a permission acquisition process according to an embodiment.

FIG. 5 is a sequence diagram showing an outline of a flow of a permission acquisition process according to the present embodiment. Execution of the permission acquisition process according to the present embodiment is triggered by the start of an application for using the system according to the present embodiment by the user. Moreover, while OAuth 2.0 authentication is used as means for receiving access permission from a cloud service in the present embodiment, other means may alternatively be used for the authentication.

In steps S201 and S202, an access permission request with respect to the cloud service is performed. By starting the application on the user terminal 9 and operating an agent of the application, the user connects the user terminal 9 to a website provided by the image data processing server 1. Moreover, while a web browser that is implemented in the application is used in the present embodiment, other web browsers that are installed in the user terminal 9 may alternatively be used to connect to the website provided by the image data processing server 1.

Subsequently, when the website of the image data processing server 1 receives an instruction to connect to the cloud service which is issued by the user via the web browser (step S201), the permission acquiring unit 23 of the image data processing server 1 transmits an access permission request to the cloud service (step S202). The access permission request represents a request made by the image data processing server 1 for using an account of the user of each cloud service. Moreover, the user account of each cloud service may be set in advance by the user or may be newly created via the application. As described earlier with reference to the service setting unit 22 and the permission acquiring unit 23, the user can specify a desired cloud service for each type of image data, in which case the permission acquiring unit 23 transmits an access permission request to a cloud service that is specified by the user.

The cloud service having received the access permission request displays a popup for authorization confirmation on the user terminal 9. Subsequently, when the user having confirmed the displayed popup performs an operation for approving (granting) the use of the account of the user of the cloud service related to the popup by the image data processing server 1, the cloud service is notified of the approval by the user, from the web browser.

In step S203, the cloud service having received the notification of the user's approval provides an authorization code to the image data processing server 1 via the web browser of the user terminal 9. The permission acquiring unit 23 of the image data processing server 1 receives, via the user terminal 9, the authorization code transmitted by the cloud service. Subsequently, the process proceeds to step S204.

In steps S204 and S205, a cloud service access token is acquired. The permission acquiring unit 23 of the image data processing server 1 transmits an access token request including the authorization code to the cloud service (step S204) and acquires an access token from the cloud service in exchange for the authorization code (step S205). The acquired access token for each cloud service is associated with an account of the user in the image data processing server 1 and saved in the image data processing server 1. Subsequently, the process shown in the present sequence diagram is finished.

As a result of the processes shown in FIGS. 4 and 5 described above, an access token for the image data processing server 1 is acquired by the scanner 3, an access token for the cloud service is acquired by the image data processing server 1, and user accounts thereof are associated with each other. Therefore, with the system according to the present embodiment, a transmission (release) of scan data from the scanner 3 to the cloud service via the image data processing server 1 can be performed as will be described later with reference to FIG. 6.

Figure 6:
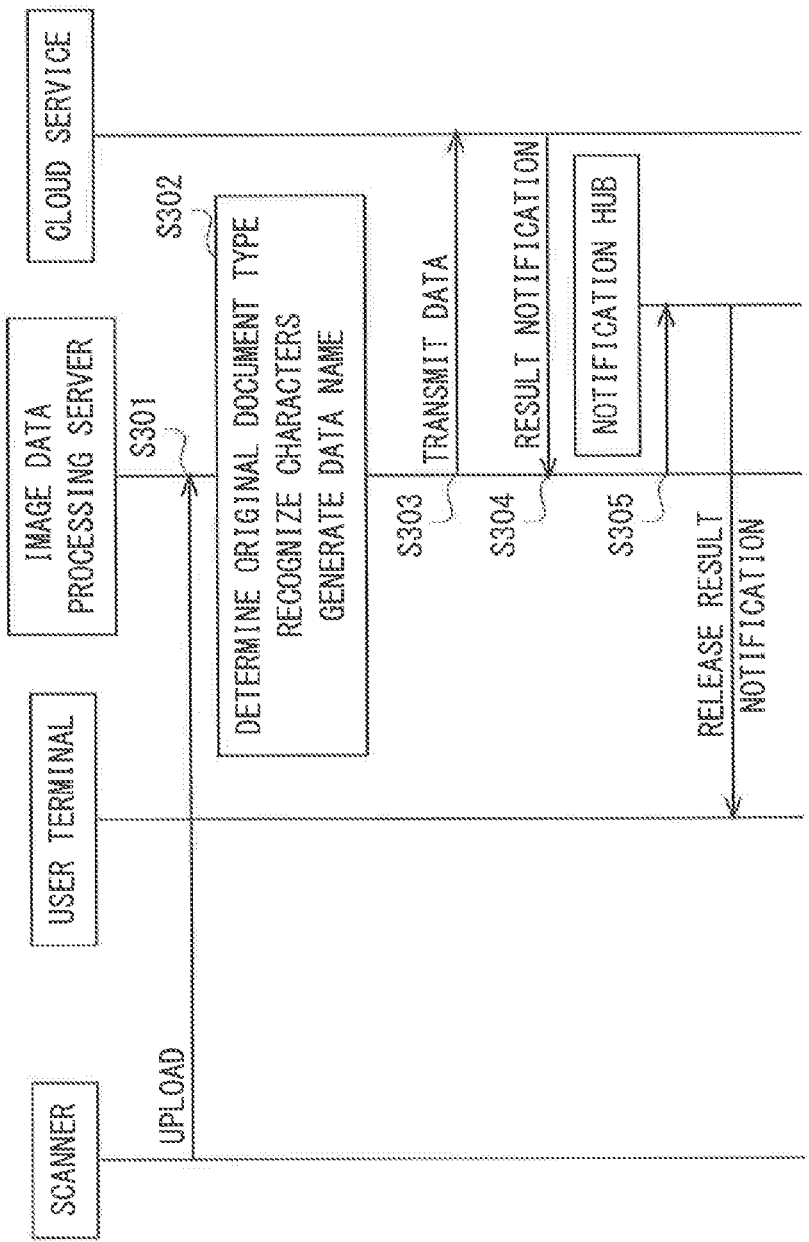
FIG. 6 is a sequence diagram showing an outline of a flow of an image data process according to an embodiment.

FIG. 6 is a sequence diagram showing an outline of a flow of an image data process according to the present embodiment. Execution of the image data process according to the present embodiment is triggered by the mounting of an original document on the scanner 3 and the user operating the scan button 38 of the scanner 3.

In step S301, scanned image data is uploaded to the image data processing server 1. When an operation of the scan button 38 is accepted by the user operation accepting unit 42 of the scanner 3, the image data acquiring unit 43 acquires image data of the original document by sending the original document to the imaging unit 37 using the sheet feeder 36 and causing the imaging unit 37 to capture an image of the original document. In addition, the image transmitting unit 44 of the scanner 3 transmits the acquired image data to the image data processing server 1. In this case, the image data processing server access token acquired in advance in step S105 is used for the transmission.

In addition, transmission of image data by the image transmitting unit 44 in the present embodiment is executed following the acquisition of the image data without involving user operations other than an operation of the scan button 38. The image receiving unit 24 of the image data processing server 1 receives image data transmitted from the scanner 3. In addition, by inspecting an access token that is received together with the image data, the image receiving unit 24 confirms whether or not the received image data has been transmitted from a user-authenticated scanner 3. When the received image data has not been received from a user-authenticated scanner 3, the process shown in the present sequence diagram is finished (not illustrated). On the other hand, when the received image data has been received from a user-authenticated scanner 3, the process proceeds to step S302.

In step S302, automatic discrimination of original document type is performed. The type determining unit 25 determines whether the received image data is image data related to any type of a document, a name card, a receipt, and a photograph/illustration. While a determination system based on image characteristics such as layout recognition, character recognition, and color recognition can be used to determine the type, the determination system is not limited to the example described in the present disclosure and various techniques including known techniques as well as techniques to be developed in the future can be adopted to determine the type.

In addition, the character recognizing unit 26 performs optical character recognition (OCR) on the image data. Furthermore, the name generating unit 27 generates a name of image data or data generated based on the image data, using a character string acquired as a result of the optical character recognition. A specific method of name generation is as described earlier. Moreover, the image data is not limited to a data format received from the scanner and may be converted into a format suitable for the determined original document type such as Portable Document Format (PDF). Subsequently, the process proceeds to step S303.

In step S303, a cloud service corresponding to the original document type is identified and data is transmitted to the concerned cloud service. The data transmitting unit 28 transmits the image data or data generated based on the image data and a generated name in accordance with the original document type determined in step S302 to a user account of the cloud service corresponding to the original document type. For the transmission of data to the user account of the cloud service, each cloud service access token which has been acquired in step S205 and which is saved in association with the user account of the image data processing server 1 is used. Subsequently, the process proceeds to step S304.

In steps S304 and S305, a release result is transmitted. When data transmission by the data transmitting unit 28 is completed and a result notification is received from the cloud service that is a transmission destination (step S304), the result notifying unit 29 of the image data processing server 1 notifies the user of completion, failure, or the like of the data transmission by performing a release result notification (step S305). Specifically, the result notifying unit 29 notifies a notification function or an application provided in the user terminal 9 as a standard feature that data has been transmitted to a predetermined cloud service and is saved in the cloud service via a predetermined notification hub service (for example, the Azure notification hub) which enables a push notification to be issued to the user terminal 9. However, other techniques may be adopted in order to issue the result notification. Subsequently, the process shown in the present sequence diagram is finished.

Figure 7:
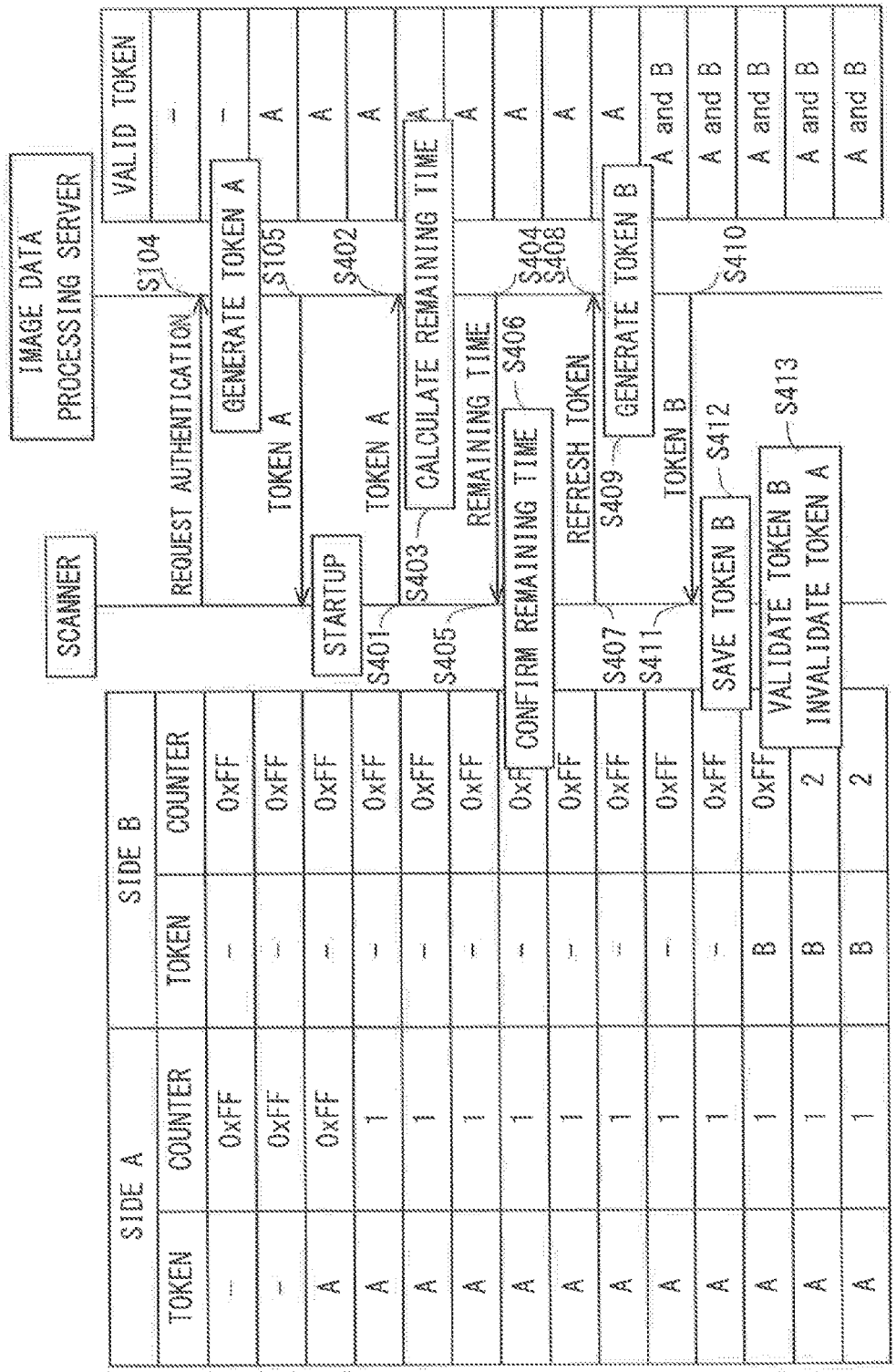
FIG. 7 is a sequence diagram showing an outline of a flow of an access token updating process according to an embodiment.

FIG. 7 is a sequence diagram showing an outline of a flow of an access token updating process according to the present embodiment. The access token updating process (the process of step S401 and thereafter) shown in the present sequence diagram is either executed every time the scanner 3 is started up and connected to the network after an image data processing server access token is issued by the image data processing server 1 to the scanner 3 in steps S104 and S105 of the account creation/user authentication process described with reference to FIG. 4 or executed periodically.

In steps S401 and S402, an access token is transmitted and received. When the scanner 3 is started up and connected to the network, the token transmitting unit 45 of the scanner 3 transmits an image data processing server access token to the image data processing server 1 (step S401). At this point, when a plurality of image data processing server access tokens are retained by the scanner 3, the token transmitting unit 45 compares data (an side-A counter and a side-B counter to be described later) associated with the plurality of image data processing server access tokens, and transmits an image data processing server access token with a highest priority to the image data processing server 1. Details of a process for determining a valid token will be described later.

The token receiving unit 212 of the image data processing server 1 receives the image data processing server access token transmitted by the scanner 3 (step S402). When an access token is received, the user authenticating unit 21 authenticates a user by determining whether or not the received access token is the image data processing server access token generated using the identification information of the scanner 3 and the expiration time related information.

Specifically, the user authenticating unit 21 performs authentication by confirming that a serial number which is extracted by decrypting the received access token matches a serial number that is associated with a user account and that an expiration time which is calculated by adding a predetermined validity period to a time stamp which is extracted by decrypting the received access token has not expired. Subsequently, the process proceeds to step S403.

In steps S403 and S404, determination information of the expiration time of the access token is generated and transmitted. The determination information transmitting unit 213 of the image data processing server 1 transmits determination information that enables a determination as to whether or not a remaining time until the expiration time of the received image data processing server access token is less than a predetermined threshold to the scanner 3. In the present embodiment, the remaining time until the expiration time is calculated as the determination information (step S403) and the remaining time is transmitted to the scanner 3 (step S404). The remaining time is calculated by comparing an expiration time with a current date and time. The expiration time is calculated by adding a predetermined validity period to a time stamp indicating a date and time of generation of an access token. However, the determination information that is transmitted from the image data processing server 1 to the scanner 3 is not limited to the example described in the present embodiment. For example, as the determination information, the determination information transmitting unit 213 may transmit information indicating whether or not the remaining time until the expiration time is less than a predetermined threshold. Subsequently, the process proceeds to step S405.

In step S405, determination information for the expiration time of the access token is received. The determination information receiving unit 46 of the scanner 3 receives the determination information from the image data processing server 1. As described above, in the present embodiment, the determination information represents a remaining time until an expiration time of an image data processing server access token.

In other words, in the present embodiment, the scanner 3 receives the determination information from the image data processing server 1 by transmitting the image data processing server access token to the image data processing server 1 upon startup of the scanner 3 or upon connection of the scanner 3 to the network. In addition, the determination information is information such as the remaining time until the expiration time of the access token which enables at least a determination to be made on how much time remains until the expiration time of the access token without having the scanner 3 obtain the expiration time of the access token itself. Therefore, by adopting the mechanism of updating an access token according to the present disclosure, a function of managing or calculating a time limit of an access token by the scanner 3 itself, a function for maintaining an accurate time and date of an internal clock, or the like can be omitted from the scanner 3. Subsequently, the process proceeds to step S406.

In step S406, the remaining time until the expiration time of the access token is confirmed. The remaining time confirming unit 47 determines whether or not the remaining time until the expiration time of the image data processing server access token is less than a predetermined threshold. Specifically, the remaining time confirming unit 47 confirms the remaining time by comparing the remaining time that is received in step S405 with the predetermined threshold. When the remaining time is determined to be equal to or greater than the threshold as a result of the remaining time confirmation, the scanner 3 ends the access token updating process. On the other hand, when the remaining time is determined to be less than the threshold, the process proceeds to step S407.

In steps S407 to S410, an access token is reissued (refreshed). When the remaining time until the expiration time of the access token is determined to be less than the threshold in step S406, the issuance request transmitting unit 48 transmits an issuance request (a refresh token) for an access token (step S407). When an issuance request (a refresh token) is received for the image data processing server access token transmitted by the scanner 3 having received the determination information (step S408), the user authenticating unit 21 of the image data processing server 1 issues a new access token with an updated expiration time (step S409). A specific generation method of the new access token is as described earlier with reference to the token generating unit 211. Subsequently, the process proceeds to step S410.

In steps S411 to S413, the new access token is saved and validated. When the new access token is received (step S411), the token managing unit 49 of the scanner 3 saves the new access token in the nonvolatile storage device 34 (step S412), and validates the new access token and invalidates the old access token (step S413). Specifically, in the present embodiment, the token managing unit 49 saves, in association with a plurality of image data processing server access tokens retained by the scanner 3, data that enables priorities among access tokens to be compared. In addition, upon receiving a new access token, the token managing unit 49 validates the new access token while invalidating other image data processing server access tokens by associating the new access token with data including a value that has a higher priority than the other image data processing server access tokens. Once validation of the new access token and invalidation of old access tokens are completed, the process shown in the present sequence diagram is ended.

Figure 8:
FIG. 8 is a diagram showing, in chronological order, a transition of possible values of an side-A counter and a side-B counter and a side that is validated at each time point in token management that is used in an embodiment.

FIG. 8 is a diagram showing, in chronological order, a transition of possible values of a counter associated with an access token that is saved on side A (hereinafter, referred to as an "side-A counter") and a counter associated with an access token that is saved on side B (hereinafter, referred to as a "side-B counter") and a side that is validated at each time point in token management that is used in the present embodiment.

The token managing unit 49 only rewrites a counter of a side related to an access token that is to be validated from an invalid state. In this case, the token managing unit 49 sets "value of counter on side related to currently valid access token+1" (however, when the value of the counter on the side related to the currently valid access token is 0xFF or 3, "1") to the counter on a side related to the access token that is to be validated. In other words, with the exception of an initial value 0xFF, the value of the side-A counter and the value of the side-B counter are never the same. In addition, when the value of the side-A counter and the value of the side-B counter are in a relationship of adjacent numerical values in the numerical sequence provided below, the access token on the side with the right-side value is handled as a valid access token.

0xFF, 1, 2, 3, 1

In other words, in a case where the values of the two counters are "0xFF" and "1", the access token on the side to which "1" is set is valid, in a case of "1" and "2", the access token on the side to which "2" is set is valid, in a case of "2" and "3", the access token on the side to which "3" is set is valid, and in a case of "3" and "1", the access token on the side to which "1" is set is valid (refer to FIG. 8). By performing such counter control, an access token on a given side can be validated and an access token on another side can be invalidated at the same time.

For example, in a case where an old access token A is saved on the side-A (steps up to S408 in FIG. 7), when a new access token B is acquired by a refresh token (steps S409 and S410), the scanner 3 saves the new access token B on the side-B of the nonvolatile storage device 34 (steps S411 and S412) and sets "value of counter on side-A that is currently valid+1" (however, when the value of the A counter that is currently valid is 3, "1") to the side-B counter (step S413). As described earlier, when a plurality of image data processing server access tokens are retained by the scanner 3, the token transmitting unit 45 compares data (an side-A counter and a side-B counter described earlier) associated with the plurality of image data processing server access tokens, and transmits an image data processing server access token with a highest priority to the image data processing server 1. Therefore, after the side-B counter is rewritten, the new access token B may be determined to be a valid token by comparing the side-A and side-B counters without having to rewrite the side-A counter.

Moreover, when some kind of abnormality such as a forced shutdown of the scanner 3 occurs during a period from the transmission of the new access token from a server to the completion of counter update, upon a next startup, the scanner 3 compares the value of the side-A counter and the value of the side-B counter with each other according to the comparison rule described above and continues communication with the image data processing server 1 using the access token on the side determined to be valid. In the present embodiment, since the image data processing server 1 handles a legitimately issued token as a valid token until its expiration time expires (an old access token is not invalidated even when a new access token is issued) when authenticating a user, the scanner 3 can recover an interrupted process using the old access token. In the present embodiment, by adopting such a configuration, an occurrence of an inconsistency in states of access token management between the scanner 3 and the image data processing server 1 is prevented. Moreover, when the scanner 3 fails to save a new access token and allows an old access token to expire, the scanner 3 performs recovery by once again issuing a refresh token.

<Variation of Access Token Updating Process>

Hereinafter, a variation of the access token updating process will be described. The access token updating process described with reference to FIGS. 1 to 8 will be referred to as a "first access token updating process" and an access token updating process to be described with reference to FIGS. 9 and 10 will be referred to as a "second access token updating process". Since a system configuration, a hardware configuration, a flow of an account creation/user authentication process, a flow of a permission acquisition process, and a flow of an image data process when implementing the second access token updating process are similar to those adopted in the embodiment of the first access token updating process, a description thereof will be omitted. In addition, configurations and processes that are similar to those of the embodiment described with reference to FIGS. 1 to 8 will be illustrated using the same reference numerals and descriptions thereof will be omitted.

Figure 9:
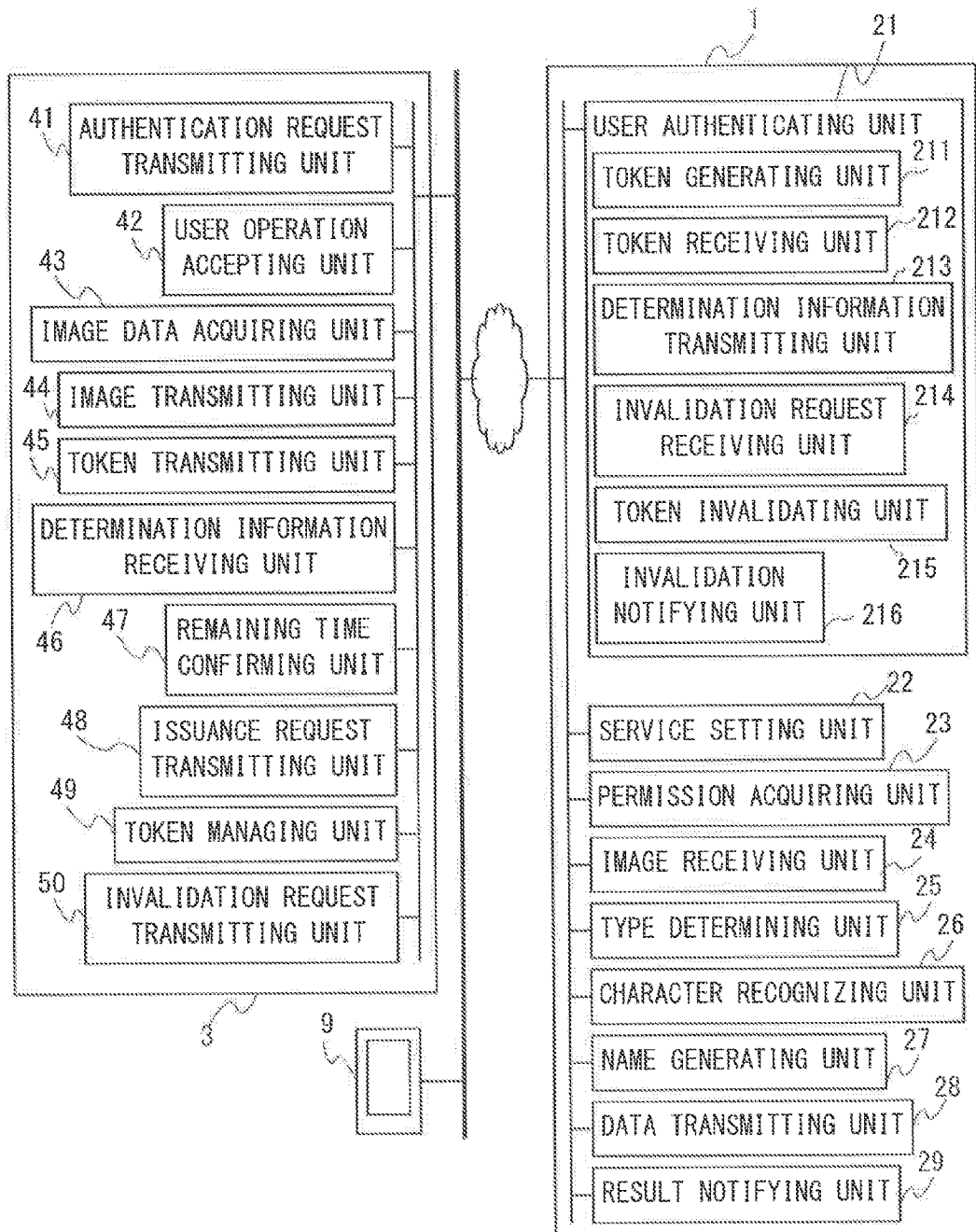
FIG. 9 is a diagram showing a variation of a functional configuration of a system according to an embodiment.

FIG. 9 is a diagram showing a variation of a functional configuration of the system according to the present embodiment. In a similar manner to the example described with reference to FIG. 3, as respective hardware included in an image data processing server 1 are controlled by having a program recorded in a storage device 14 read by a RAM 13 and executed by a CPU 11, the image data processing server 1 functions as a device that includes a user authenticating unit 21, a service setting unit 22, a permission acquiring unit 23, an image receiving unit 24, a type determining unit 25, a character recognizing unit 26, a name generating unit 27, a data transmitting unit 28, and a result notifying unit 29.

In a similar manner to the example described with reference to FIG. 3, in order to authenticate a user of the scanner 3, the user authenticating unit 21 includes a token generating unit 211, a token receiving unit 212, and a determination information transmitting unit 213. However, in the example shown in FIG. 9, the user authenticating unit 21 further includes an invalidation request receiving unit 214, a token invalidating unit 215, and an invalidation notifying unit 216.

The invalidation request receiving unit 214 receives a request for invalidating an old access token from the scanner 3 which has received a new access token and has validated the new access token.

The token invalidating unit 215 invalidates the old access token when an invalidation request is received. Moreover, an invalidation of a token according to the present embodiment includes not only invalidation by a flag process or the like but also deleting the old access token from the storage device 14 of the image data processing server 1 or from an external database. In the first access token updating process described with reference to the sequence diagram shown in FIG. 7, since the image data processing server 1 performs user authentication by decrypting an access token received from the scanner 3 and evaluating a serial number, time stamp information, and the like, the access token is not saved in the image data processing server 1. However, in the present variation, since an access token is also explicitly invalidated at the image data processing server 1, the access token may be saved in the image data processing server 1.

When the old access token is invalidated by the image data processing server 1, the invalidation notifying unit 216 notifies the scanner 3 of the invalidation.

In a similar manner to the example described with reference to FIG. 3, as respective hardware included in the scanner 3 are controlled by having a program recorded in a storage device 34 read by a RAM 33 and executed by a CPU 31, the scanner 3 functions as a device that includes an authentication request transmitting unit 41, a user operation accepting unit 42, an image data acquiring unit 43, an image transmitting unit 44, a token transmitting unit 45, a determination information receiving unit 46, a remaining time confirming unit 47, an issuance request transmitting unit 48, and a token managing unit 49. However, in the example shown in FIG. 9, the scanner 3 further includes an invalidation request transmitting unit 50.

When validation of a new access token by the scanner 3 is completed, the invalidation request transmitting unit 50 transmits an invalidation request of the old access token to the image data processing server 1.

Figure 10:
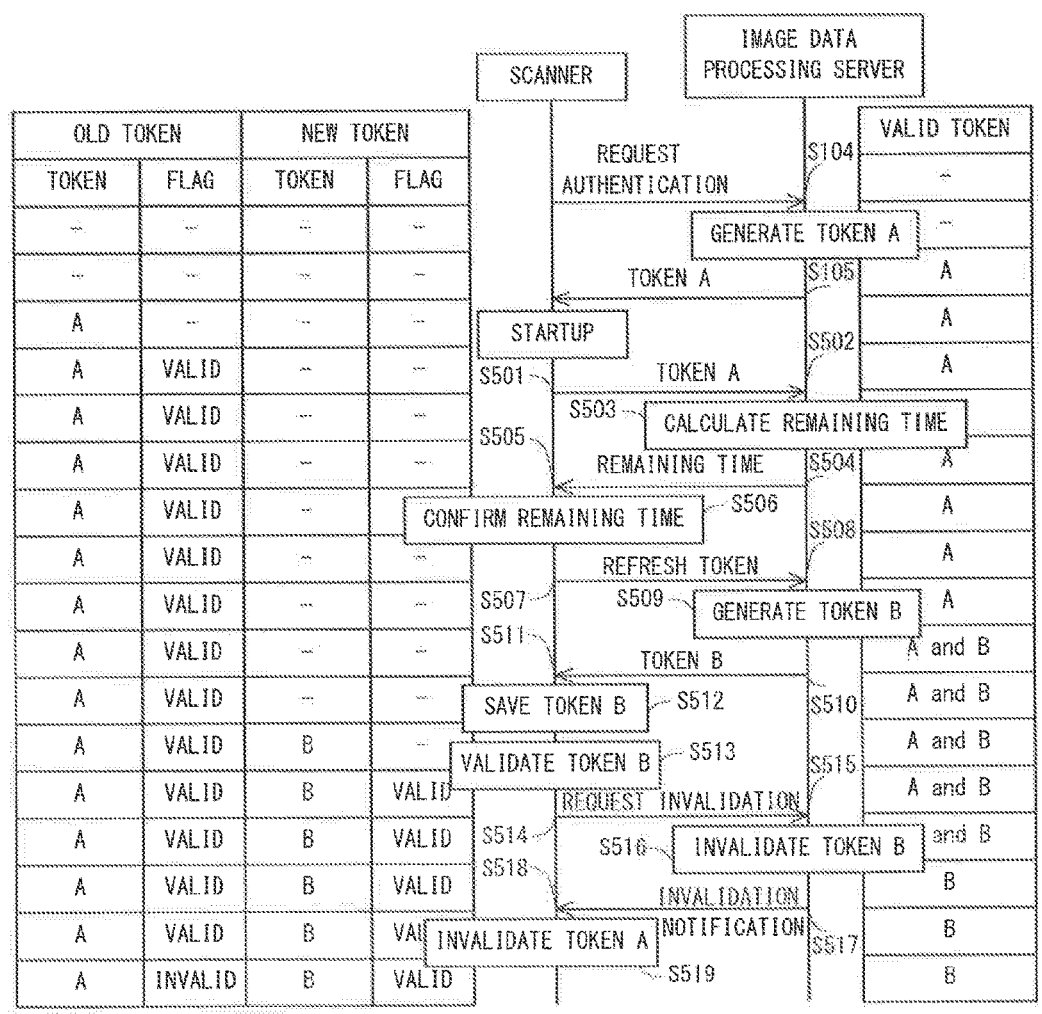
FIG. 10 is a sequence diagram showing an outline of a variation of an access token updating process according to an embodiment.

FIG. 10 is a sequence diagram showing an outline of a flow of a variation of the access token updating process according to the present embodiment. The access token updating process (the process of step S501 and thereafter) shown in the present sequence diagram is either executed every time the scanner 3 is started up and connected to the network after an image data processing server access token is issued by the image data processing server 1 to the scanner 3 in steps S104 and S105 of the account creation/user authentication process described with reference to FIG. 4 or executed periodically.

Since the process of steps S501 to S512 is approximately similar to the process of steps S401 to S412 described with reference to FIG. 7, a description thereof will be omitted. However, unlike the first access token updating process in which validation/invalidation of an access token is controlled using counters, in the second access token updating process, validation/invalidation of an access token is controlled using flags. To this end, in step S501, the token transmitting unit 45 refers to flags that are associated with image data processing server access tokens and transmits an image data processing server access token that is set to a validated state to the image data processing server 1. Subsequently, when the process of steps S502 to S512 is executed and a new access token that is received from the image data processing server 1 is saved in the nonvolatile storage device 34 of the scanner 3, the process advances to S513.

In step S513, the new access token is validated by the scanner 3. The token managing unit 49 validates the new access token by setting a flag associated with the new access token to "valid". However, in the second access token updating process, since validation/invalidation of an access token is controlled using flags, validation of a new access token and invalidation of an old access token cannot be performed at the same time. Therefore, at this point, both the new access token and the old access token are valid at the scanner 3. Subsequently, the process proceeds to step S514.

In steps S514 to S517, the old access token is invalidated by the image data processing server 1. In response to the completion of validation of the new access token by the scanner 3 in step S513, the invalidation request transmitting unit 50 transmits an invalidation request of the old access token to the image data processing server 1 (step S514). The invalidation request receiving unit 214 of the image data processing server 1 receives the invalidation request of the old access token from the scanner 3 (step S515). When the invalidation request is received, the token invalidating unit 215 invalidates the old access token at the image data processing server 1 (step S516) and the invalidation notifying unit 216 transmits a notification of the invalidation to the scanner 3 (step S517). Subsequently, the process proceeds to step S518.

In steps S518 and S519, the old access token is invalidated at the scanner 3. When an invalidation notification which notifies that the old access token has been invalidated at the image data processing server 1 is received (step S518), the token managing unit 49 invalidates the old access token by setting a flag that is associated with the old access token to "invalid" (step S519). Subsequently, the process shown in the present sequence diagram is finished.

Moreover, when some kind of abnormality such as a forced shutdown of the scanner 3 occurs during a period from the issuance of the new access token at a server to the completion of invalidation of the old access token, upon a next startup, the scanner 3 refers to validation/invalidation settings of the access tokens that are saved in the storage device 34 and continues communication with the image data processing server 1 using an access token determined to be valid. In the present embodiment, since the user authenticating unit 21 of the image data processing server 1 handles both a new access token and an old access token as valid access tokens during a period from the issuance of the new access token to the invalidation of the old access token at the image data processing server 1 when authenticating a user, the scanner 3 can recover an interrupted process using either the new access token or the old access token. In the present embodiment, by adopting such a configuration, an occurrence of an inconsistency in states of access token management between the scanner 3 and the image data processing server 1 is prevented. Moreover, when the scanner 3 fails to save the new access token and allows the old access token to expire, the scanner 3 performs recovery by once again issuing a refresh token.

Moreover, in the present variation, since token management based on counters such as that described with reference to FIG. 8 is not performed and a flag indicating validation/invalidation is set to each token, a period occurs at the scanner 3 in which both a new access token and an old access token are valid, albeit for a short period of time. When some kind of abnormality such as a forced shutdown of the scanner 3 occurs during this period, the token transmitting unit 45 determines which token is the new access token based on magnitudes of values included in the tokens or the like and preferentially transmits the new access token to the image data processing server 1.

Advantageous Effects

According to the access token updating process described above, confirmation of a remaining time until an expiration time of an access token is performed upon startup of a scanner or upon connection of the scanner to the image data processing server 1. When an access token expires, while an expiration error conventionally occurs during a normal communication process (for example, when image data is being uploaded) and the user must undertake remedial procedures, by adopting the access token updating process according to the present disclosure, an occurrence of expiration of an access token can be detected in advance and scanner firmware can internally issue a refresh token to prevent an occurrence of an expiration error during a process.

In addition, with a user device including a drive unit such as a scanner, by confirming the expiration of an access token in advance and avoiding a token refresh process from being performed while the drive unit is being controlled, a situation where the token refresh process affects the control of the drive unit and causes damage to the device can be prevented.

What is claimed is:

1. A system comprising a server and a user device which are connected to each other via a network,
the server including:
a first hardware processor to authenticate, using an access token, a user of a user device connected via the network;
the first hardware processor to receive an access token from the user device; and
the first hardware processor to transmit, when the access token is received, determination information that enables a determination as to whether or not a remaining time until a time of expiration of the access token from a time of the determination is less than a predetermined threshold, to the user device, and
the user device including:
a second hardware processor to transmit an authentication request to the server;
the second hardware processor to transmit the access token to the server;
the second hardware processor to receive the determination information from the server;
the second hardware processor to determine, when the determination information is received, whether or not a remaining time until a time of expiration of the access token is less than a predetermined threshold;
the second hardware processor to transmit an issuance request for an access token when the remaining time until the time of expiration of the access token is determined to be less than the predetermined threshold; and
a token managing unit to, when receiving a new access token, validate the new access token and invalidating an old access token, wherein
the first hardware processor issues a new access token with an updated time of expiration when an issuance request for an access token which is transmitted by the user device having received the determination information is received,
the token managing unit associates, with a plurality of access tokens retained in the user device, data which enables priorities among the access tokens to be compared, and when the new access token is received, associates the new access token with the data including a value that has a higher priority than other access tokens in order to validate the new access token and invalidate the other access tokens at the same time, and
when a plurality of access tokens are retained in the user device, the second hardware processor compares the data associated with the plurality of access tokens, and transmits an access token with a highest priority to the server;
wherein the first hardware processor authenticates the user by handling both the new access token and an old access token as valid access tokens during a period from issuance of the new access token to expiration of a time of expiration of the old access token.

2. The system according to claim 1, wherein the determination information receiving unit receives, from the server, the remaining time until the time of expiration of the access token as the determination information.

3. The system according to claim 1, the server further comprising a token generating unit to generate an access token using identification information of the user device and time of expiration related information that is related to a time of expiration of the access token, wherein the first hardware processor authenticates the user by determining whether or not the access token received from the user device is the access token that is generated using the identification information of the user device and the time of expiration related information.

* * * * *